(12) United States Patent
Nishide (10) Patent No.: US 11,829,665 B2
(45) Date of Patent: Nov. 28, 2023

(54) PRINT JOB MANAGEMENT METHOD AND APPARATUS FOR CREATING MULTIPLE JOB BATCHES FROM PRINT JOBS

(71) Applicant: SCREEN HOLDINGS CO., LTD., Kyoto (JP)

(72) Inventor: Hiroshi Nishide, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/953,660

(22) Filed: Sep. 27, 2022

(65) Prior Publication Data

US 2023/0107758 A1  Apr. 6, 2023

(30) Foreign Application Priority Data

Oct. 1, 2021 (JP) ................................ 2021-162449

(51) Int. Cl.
*G06F 3/12* (2006.01)

(52) U.S. Cl.
CPC .......... *G06F 3/1251* (2013.01); *G06F 3/1206* (2013.01); *G06F 3/1262* (2013.01); *G06F 3/1287* (2013.01)

(58) Field of Classification Search
CPC .... G06F 3/1251; G06F 3/1206; G06F 3/1262; G06F 3/1287
USPC ....................................................... 358/1.15
See application file for complete search history.

(56) References Cited

U.S. PATENT DOCUMENTS

| | | | | |
|---|---|---|---|---|
| 7,391,528 | B2 * | 6/2008 | Kacker | H04L 67/10 358/1.14 |
| 9,176,690 | B2 * | 11/2015 | Jacobs | G06F 3/1282 |
| 2005/0062792 | A1 * | 3/2005 | Kojima | B41J 2/16526 347/23 |
| 2008/0256541 | A1 * | 10/2008 | Rai | G06F 9/4843 718/101 |
| 2020/0081667 | A1 * | 3/2020 | Nishio | H04N 1/0092 |
| 2020/0081674 | A1 | 3/2020 | Fukami | |
| 2020/0310725 | A1 | 10/2020 | Fukami | |
| 2021/0064305 | A1 | 3/2021 | Kikumoto et al. | |

(Continued)

FOREIGN PATENT DOCUMENTS

| | | |
|---|---|---|
| JP | 2005-169918 A | 6/2005 |
| JP | 2016-081956 A | 5/2016 |
| JP | 2021-030635 A | 3/2021 |

*Primary Examiner* — Allen H Nguyen
(74) *Attorney, Agent, or Firm* — McDermott Will & Emery LLP (57) ABSTRACT

A technique is provided with which it is possible to effectively consume a plurality of continuous base materials with different remaining amounts. A job list and a continuous paper list are prepared. The job list registers job attribute information that includes print length information that indicates the length of continuous paper necessary for printing of each print job. The continuous paper list registers continuous-base-material attribute information that includes paper remaining information that indicates a remaining length of each roll of continuous paper. Then, a job batch is generated in accordance with the continuous-paper attribute information and the job attribute information. The job batch defines one roll of continuous paper and a print job, the continuous paper being selected from among the continuous paper list, the print job being extracted from among the job list and printable on the selected continuous paper.

12 Claims, 8 Drawing Sheets

(56) References Cited

U.S. PATENT DOCUMENTS

2021/0103416 A1\* 4/2021 Arakawa ............... G06F 3/1285
2021/0109685 A1\* 4/2021 Ishikawa ............... G06F 3/1204

\* cited by examiner

PRINT JOB MANAGEMENT METHOD AND APPARATUS FOR CREATING MULTIPLE JOB BATCHES FROM PRINT JOBS

RELATED APPLICATIONS

This application claims the benefit of Japanese Application No. 2021-162449 filed on Oct. 1, 2021, the disclosure of which is incorporated by reference herein.

BACKGROUND OF THE INVENTION

Field of the Invention

The subject matter disclosed in the specification of the present invention relates to a print job management method, a printing method, a print job management device, a printing apparatus, and a recording medium.

Description of the Background Art

In printing apparatuses that do printing on continuous base materials such as roll paper, a plurality of print jobs may be assigned to a continuous base material. For example, Japanese Patent Application Laid-Open No. 2021-30635 discloses a technique for dynamically changing an estimated time required for printing, depending on a combination of print jobs, when a plurality of print jobs is assigned to one roll of paper.

The printing apparatuses described above first use a new continuous base material for printing and, depending on the amount of printing, may leave the partly used continuous base material unused. In the case where such a partly used continuous base material is used for another print job, the user first calculates the remaining amount of the continuous base material from the amount of previous usage and then sets a print job that is printable on the remaining continuous base material. As a result of doing printing in accordance with the set print job, the partly used continuous base material is consumed.

However, in the case where there is a plurality of rolls of continuous paper with different remaining amounts, the operation of determining which print job should be assigned to which roll of continuous paper is enormously complicated and becomes heavy burdens on the user. There is thus the demand for a technique that allows effective consumption of a plurality of continuous base materials with different remaining amounts.

SUMMARY OF THE INVENTION

Technical Problem

It is an object of the present invention to provide a technique that allows effective consumption of a plurality of continuous base materials with different remaining amounts.

Solution to Problem

To solve the problem described above, a first aspect of the present invention is a print job management method for managing a print job that defines print content to be printed on a long band-like continuous base material by a printer. The print job management method includes a) preparing a continuous-base-material list that is a list of a plurality of continuous base materials and that registers continuous-base-material attribute information that includes paper remaining information that indicates a remaining length of each of the plurality of continuous base materials, b) preparing a job list that is a list of a plurality of print jobs, each being the print job, and that registers job attribute information that includes print length information that indicates a length of a continuous base material necessary for printing of each of the plurality of print jobs, and c) generating a job batch that defines a continuous base material and a print job in accordance with the continuous-base-material attribute information and the job attribute information, the continuous base material being selected from among the continuous-base-material list, the print job being extracted from among the job list and printable on the continuous base material selected.

According to the print job management method of the first aspect, even if there are a plurality of continuous base materials with different remaining amounts, a job batch is generated that defines an appropriate combination of a continuous base material and a print job in accordance with the remaining amount of each roll of continuous base material and the print length of each print job. Since printing is done in accordance with this job batch, it is possible to effectively consume the continuous base materials with different remaining amounts.

A second aspect of the present invention is the print job management method of the first aspect, in which the operation c) includes selecting a continuous base material with a smaller remaining amount with higher priority from among the continuous-base-material list.

According to the print job management method of the second aspect, continuous base materials with smaller remaining amounts are used with higher priority. This allows efficient consumption of the continuous base materials.

A third aspect of the present invention is the print job management method of the first aspect, in which the operation c) includes selecting the continuous base material from among the continuous-base-material list to minimize a total number of continuous base materials to be used for printing of the plurality of print jobs in the job list.

According to the print job management method of the third aspect, it is possible to minimize the number of exchanges of the continuous base materials and thereby to do printing efficiently.

A fourth aspect of the present invention is the print job management method of any one of the first to third aspects, in which the operation c) includes dividing the plurality of print jobs in the job list into a plurality of job batches, each being the job batch, while keeping an order defined in the job list unchanged.

According to the print job management method of the fourth aspect, print jobs are printed in the order defined in the job list.

A fifth aspect of the present invention is the print job management method of any one of the first to fourth aspects, in which the operation c) includes dividing the plurality of print jobs in the job list into a plurality of job batches, each being the job batch, in no particular order.

According to the print job management method of the fifth aspect, print jobs are assigned to continuous base materials in accordance with the remaining amounts of the continuous base materials, irrespective of the order defined in the job list. This improves the efficiency of consumption of the continuous base materials.

A sixth aspect of the present invention is the print job management method of any one of the first to fifth aspects, in which the operation c) includes dividing a print job that is printable separately on different continuous base materials in the job list into a plurality of job batches, each being the job batch.

According to the print job management method of the sixth aspect, one print job is divided into a plurality of job batches. This improves the efficiency of consumption of the continuous base materials.

A seventh aspect of the present invention is the print job management method of the sixth aspect, in which the continuous-base-material attribute information further includes type information that indicates a type of each of the plurality of continuous base materials, and the job attribute information includes base material information that indicates a type of a continuous base material to be used for printing.

According to the print job management method of the seventh aspect, even if there are a plurality of types of continuous base materials, a job batch is generated that defines an appropriate combination of a continuous base material and a print job.

An eighth aspect of the present invention is a printing method that includes performing the print job management method according to claim 1, and doing printing on the continuous base material defined in the job batch in accordance with the print job defined in the job batch.

According to the printing method of the eighth aspect, it is possible to do printing in accordance with the print job defined in the job batch.

A ninth aspect of the present invention is a print job management device for managing a print job that defines print content to be printed on a long band of continuous base material by a printer. The print job management device includes a continuous-base-material list management part that manages a continuous-base-material list that is a list of a plurality of continuous base materials, each being the continuous base material, and that registers continuous-base-material attribute information that includes paper remaining information that indicates a remaining length of each of the continuous base materials, a job list management part that manages a job list that is a list of a plurality of print jobs, each being the print job, and that registers job attribute information that includes print length information that indicates a length of a continuous base material necessary for printing of each of the plurality of print jobs, and a job batch generator that generates a job batch that defines a continuous base material and a print job in accordance with the continuous-base-material attribute information and the job attribute information, the continuous base material being selected from among the continuous-base-material list, the print job being extracted from among the job list and printable on the continuous base material selected.

According to the print job management device of the ninth aspect, even if there are a plurality of continuous base materials with different remaining amounts, a job batch is generated that defines an appropriate combination of a continuous base material and a print job. Since printing is done in accordance with this job batch, it is possible to effectively consume the continuous base materials with different remaining amounts.

A tenth aspect of the present invention is a printing apparatus that includes the print job management device of the ninth aspect and a printer that does printing of the print job defined by the job batch on the continuous base material defined by the job batch, the job batch being generated by the print job management device.

According to the printing apparatus of the tenth aspect, printing is done on the continuous base material defined in the job batch in accordance with the print job.

An eleventh aspect of the present invention is a recording medium recording a program that is executable by a computer. The program causes the computer to execute the print job management method according to any one of the first to seventh aspects These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the accompanying drawings. Note that constituent elements described in the embodiment are merely examples, and the scope of the present invention is not intended to be limited thereto. To facilitate understanding of the drawings, the dimensions or number of each constituent element may be illustrated in exaggerated or simplified form as necessary.

1. Embodiment

Figure 1:
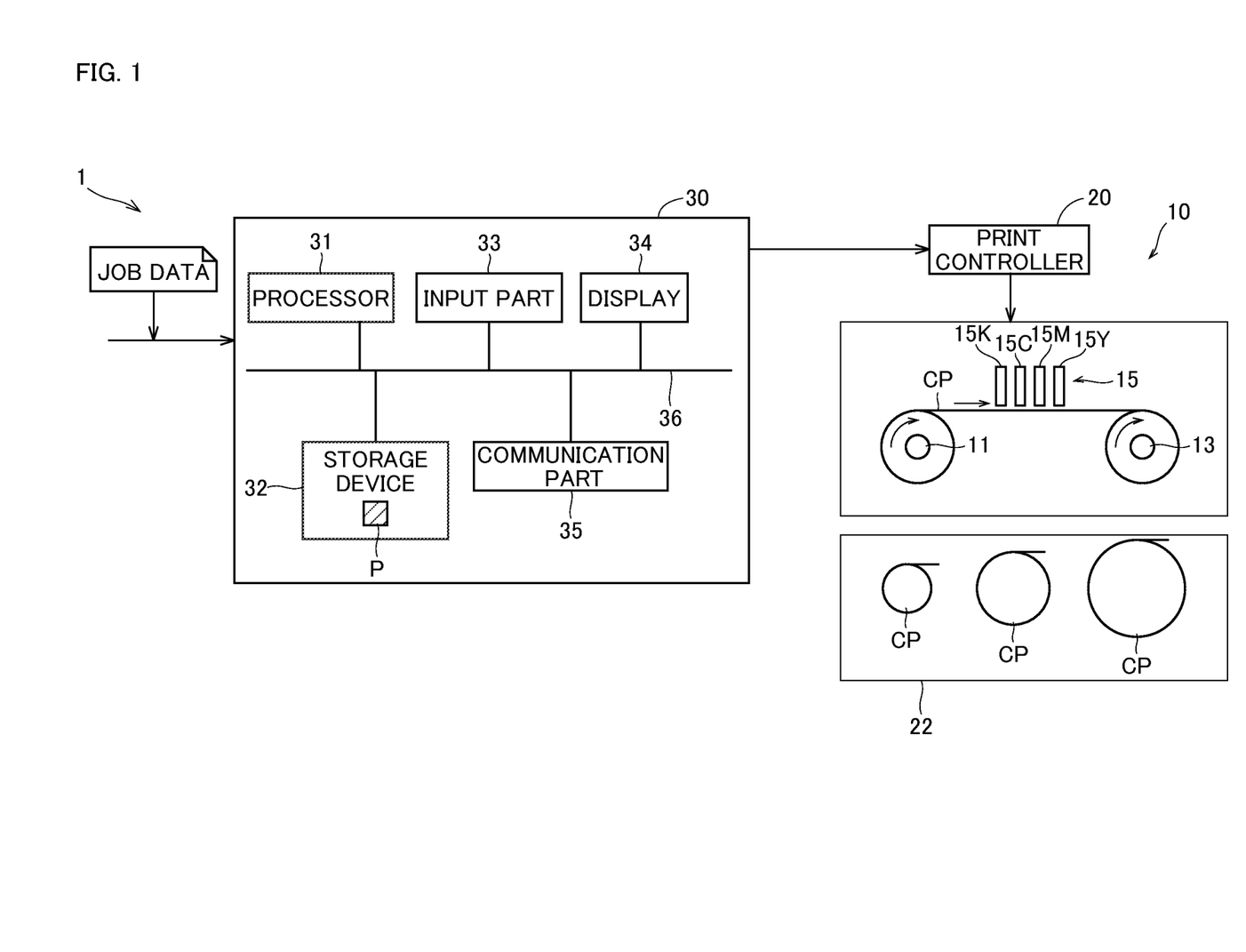
FIG. 1 is a schematic illustration of a configuration of a printing system according to an embodiment of the present invention.

FIG. 1 is a schematic illustration of a configuration of a printing system 1 according to an embodiment. The printing system 1 (printing apparatus) includes a printer 10 that does printing on continuous paper CP, and a print job management device 30 that manages print jobs for controlling printing by the printer 10. The continuous paper CP is configured as band-like paper that is wound in a roll.

Printer 10

As illustrated in FIG. 1, the printer 10 includes a feed roller 11, a take-up roller 13, a printing part 15, and a print controller 20.

The feed roller 11 and the take-up roller 13 are each rotatably supported by a frame member not shown. A roll of continuous paper CP is placed on the feed roller 11. The take-up roller 13 is fixed to the front end of the continuous paper CP placed on the feed roller 11. The take-up roller 13 is rotationally driven by a motor not shown. When the take-up roller 13 rotates, the continuous paper CP is pulled out of the feed roller 11 and transported to the take-up roller 13 along a predetermined transport path.

The printing part 15 forms an image by ejecting ink droplets on the surface of the continuous paper CP transported along the transport path. The printing part 15 includes an ejection head 15K that ejects black ink, an ejection head 15C that ejects cyan ink, an ejection head 15M that ejects magenta ink, and an ejection head 15Y that ejects yellow ink, which are arranged in the order specified toward the downstream in the transport direction (toward the take-up roller 13). The ejection heads 15K, 15C, 15M, and 15Y are arranged at positions facing the surface of the continuous paper CP, which is transported along the transport path. Note that the order of arrangement of the ejection heads 15K, 15C, 15M, and 15Y is not limited to the order described above. For example, the ejection heads may be arranged in the order of 15Y, 15M, 15C, and 15K.

The print controller 20 controls operations of each consistent element of the printer 10. For example, the print controller 20 may be configured as a computer that includes a general-purpose processor such as a central processing unit (CPU) or a graphics processing unit (GPU), a main storage device such as a random access memory (RAM), and an auxiliary storage device such as a hard disk. The print controller 20 controls the printing part 15 and the motor for rotating the take-up roller 13 in accordance with a job batch JB transmitted from the print job management device 30 so as to cause the printer 10 to do printing. The contents of the job batch JB will be described later.

As illustrated in FIG. 1, the printing system 1 includes a continuous-paper stocker 22. The continuous-paper stocker 22 is a placement space where a plurality of rolls of continuous paper CP are retained. The continuous-paper stocker 22 may retain not only new continuous paper CP but also used continuous paper CP that has not been used completely and partly left unused by, for example, the printer 10. In this way, a plurality of rolls of continuous paper CP with different printable remaining lengths are retained in the continuous-paper stocker 22. Note that the printer 10 may further include a device that takes out target continuous paper CP from the continuous-paper stocker 22 and a device that places continuous paper CP on the feed roller 11 and the take-up roller 13 of the printer 10.

Print Job Management Device

The print job management device 30 includes a processor 31, a storage device 32, an input part 33, a display 34, and a communication part 35. The storage device 32, the input part 33, the display 34, and the communication part 35 are electrically connected to the processor 31 via a bus 36.

The processor 31 is configured as a processing unit such as a CPU that performs arithmetic operations. The storage device 32 includes a main storage device such as a RAM. The storage device 32 may further include a non-transitory auxiliary memory such as a hard disk. The storage device 32 stores various types of information and a program P.

The input part 33 accepts user's operation of input to the print job management device 30. The input part 33 may be configured as, for example, a keyboard, a mouse, a button, or a switch. The display 34 displays various types of information. The display 34 may be configured as, for example, a liquid crystal display or an organic electroluminescence (EL) display. The communication part 35 is a device for establishing communication between the print job management device 30 and the print controller 20 of the printer 10.

Note that the input part 33 and the display 34 do not necessarily have to be different members. For example, the input part 33 and the display 34 may be a device such as a tablet terminal that has both the function of accepting input from a user and the function of displaying various types of information to a user.

The print job management device 30 may include a reader that reads information recorded on a non-transitory recording medium such as an optical disk (not shown). The program P recorded on the recording medium may be read by the reader and provided to the print job management device 30. As another alternative, the program P may be provided to the print job management device 30 via a communication network such as the Internet.

Figure 2:
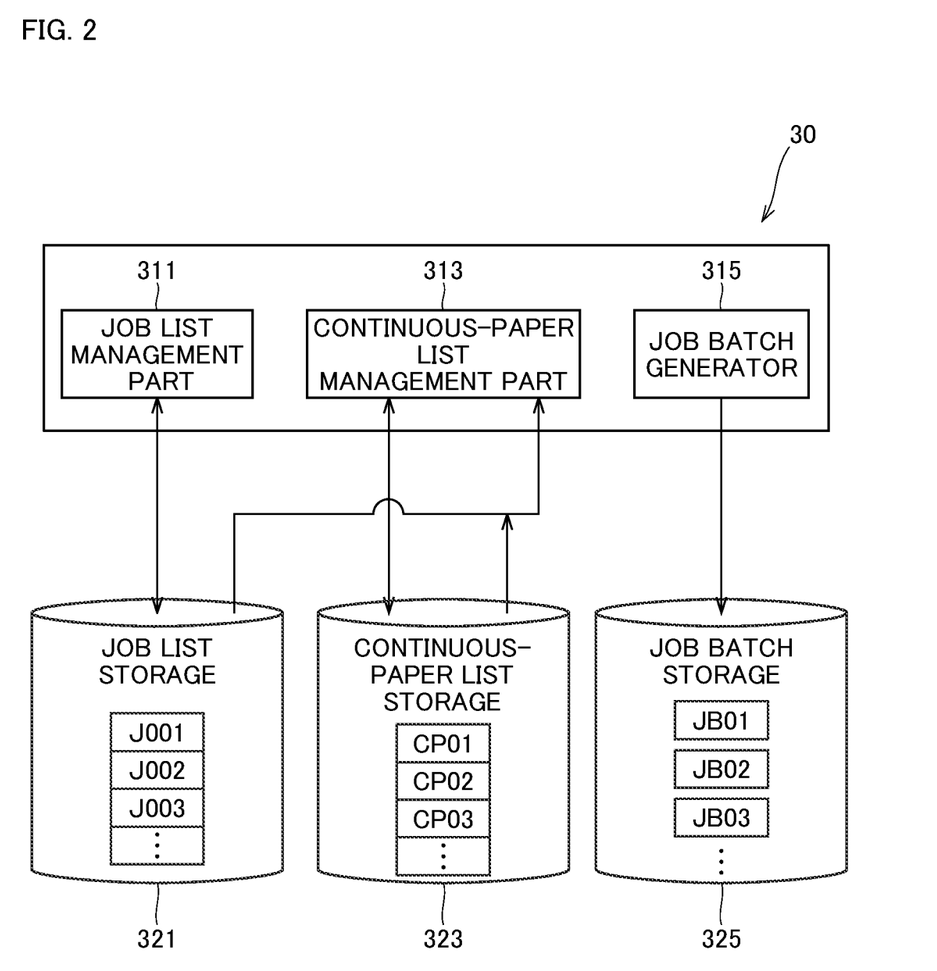
FIG. 2 is a block diagram illustrating a functional configuration of a print job management device.

FIG. 2 is a block diagram illustrating a functional configuration of the print job management device 30. A job list management part 311, a continuous-paper list management part 313, and a job batch generator 315 illustrated in FIG. 2 are functions of the print job management device 30 that are achieved by the processor 31 operating in accordance with the program P. A job list storage 321, a continuous-paper list storage 323, and a job batch storage 325 are functions achieved by the storage device 32.

The job list management part 311 manages print jobs that define the contents of printing to be done by the printer 10. Specifically, the job list management part 311 manages a plurality of print jobs in accordance with a job list L1 stored in the job list storage 321.

Figure 3:
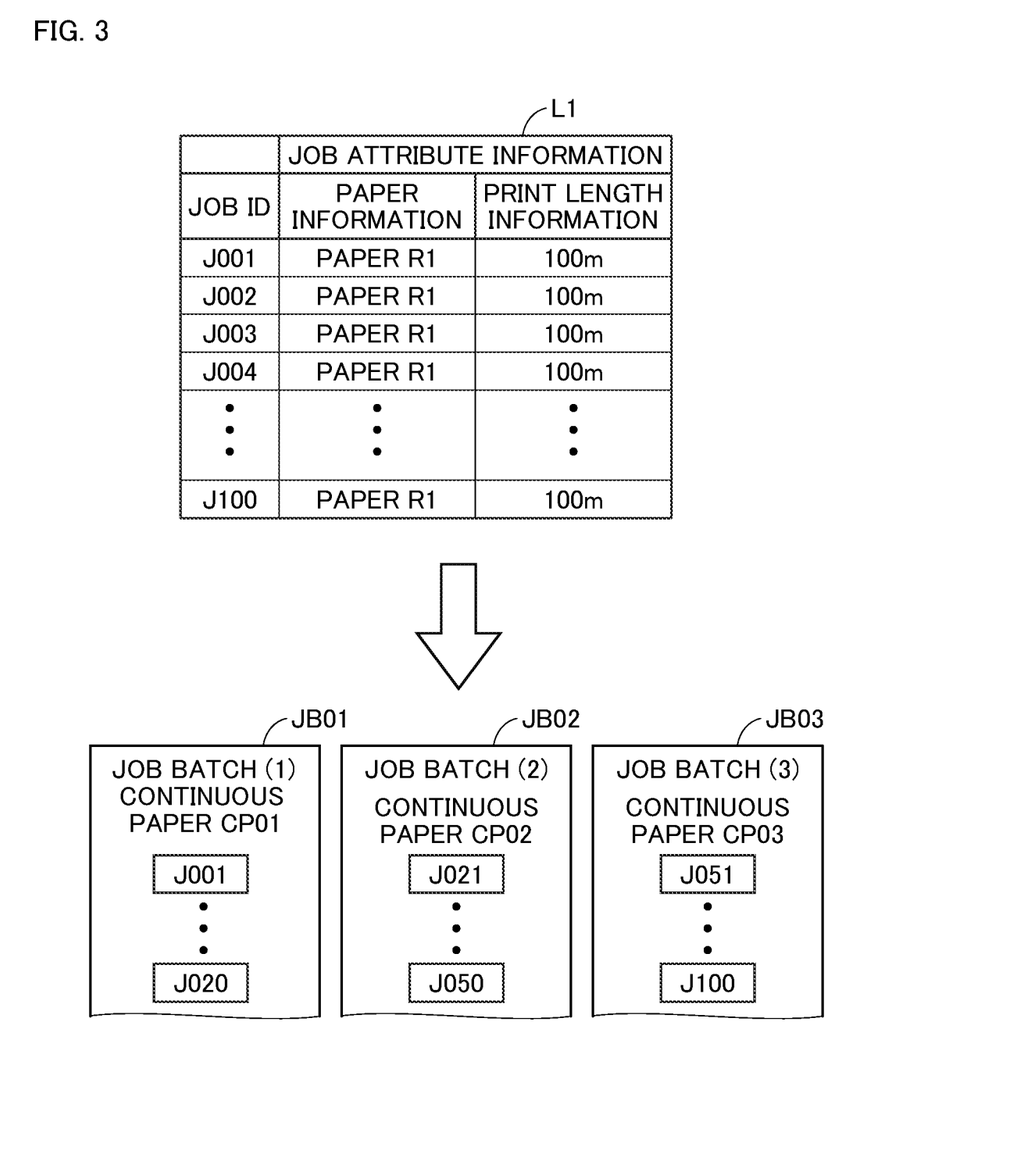
FIG. 3 is an illustration of a job list.

FIG. 3 is an illustration of the job list L1. As illustrated in FIG. 3, the job list L1 registers an identifier (print job ID) of each print job and job attribute information that indicates the attribute of the print job in a one-to-one correspondence. The job attribute information may include, for example, paper information and print length information. The paper information is information that indicates the type of continuous paper CP to be used for printing of each print job. The print length information is information that indicates the length of continuous paper CP necessary for printing of each print job.

In the example of the job list L1 illustrated in FIG. 3, 100 print jobs J001 to J100 are registered. Also, the paper information of "Paper R1" and the print length information of "100 m" are registered as the job attribute information.

When a new print job to be printed arises, the job list management part 311 adds this new print job to the job list L1. That is, the job list management part 311 registers the identifier of the new print job and job attribute information on the new print job in the job list L1. The job list management part 311 also deletes, from the job list L1, a print job for which a print instruction has been issued to the printer 10, or a print job for which printing has been completed by the printer 10. In this way, the job list L1 is updated appropriately by the job list management part 311.

Referring back to FIG. 2, the continuous-paper list management part 313 manages continuous paper CP used by the printer 10. Specifically, the continuous-paper list management part 313 manages a plurality of rolls of continuous paper CP retained in the continuous-paper stocker 22 in accordance with a continuous paper list L2 stored in the continuous-paper list storage 323.

Figure 4:
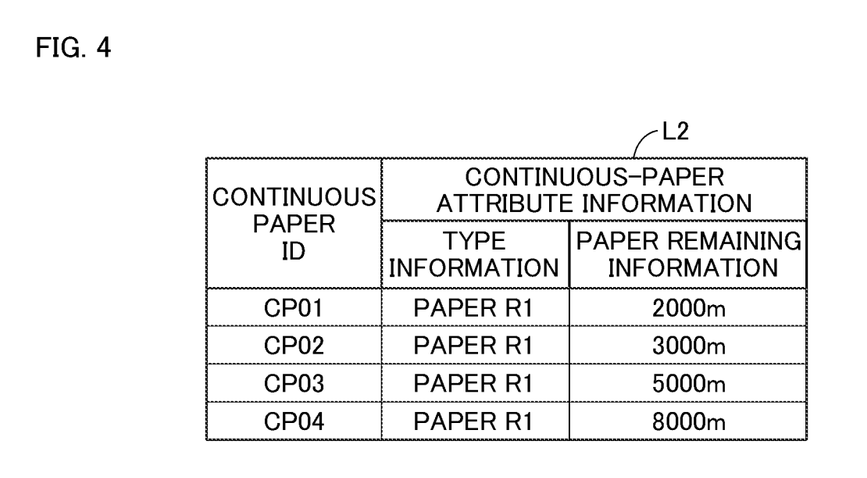
FIG. 4 is an illustration of a continuous paper list.

FIG. 4 is an illustration of the continuous paper list L2. As illustrated in FIG. 4, the continuous paper list L2 registers an identifier (continuous paper ID) of each roll of continuous paper CP and continuous-paper attribute information that indicates the attribute of each roll of continuous paper CP in a one-to-one correspondence. The continuous-paper attribute information may include, for example, type information and paper remaining information. The type information is information that indicates the type of the continuous paper.

The paper remaining information is information that indicates the remaining printable length that can be used for printing.

In the example of the continuous paper list L2 illustrated in FIG. 4, four rolls of continuous paper CP01 to CP04 are registered. Also, the type information of "Paper R1" and the paper remaining information of "2000 m," "3000 m," "5000 m," and "8000 m" are registered as the continuous-paper attribute information.

When new continuous paper CP is added to the continuous-paper stocker 22, the continuous-paper list management part 313 adds the new continuous paper CP to the continuous paper list L2 in accordance with operation input from a user. That is, the continuous-paper list management part 313 registers the identifier of the new continuous paper CP and the continuous-paper attribute information on the new continuous paper CP in the continuous paper list L2. In the case where the printer 10 uses any continuous paper CP registered in the continuous paper list L2, the continuous-paper list management part 313 appropriately updates the continuous-paper attribute information on the used continuous paper CP in accordance with the amount of usage. In the case where any continuous paper CP is discarded after use or due to any other reason, the continuous-paper list management part 313 performs processing for deleting information on the discarded continuous paper CP from the continuous paper list L2 in accordance with operation input from a user. In this way, the continuous paper list L2 is updated appropriately by the continuous-paper list management part 313.

Referring back to FIG. 2, the job batch generator 315 generates a job batch JB. The job batch JB is data that defines one roll of continuous paper CP and a print job, the continuous paper being selected based on a predetermined condition, the print job being selected from among the job list L1 and printable on the selected continuous paper CP. The job batch JB generated by the job batch generator 315 is stored in the job batch storage 325.

In the example illustrated in FIG. 3, three job batches JB01, JB02, and JB03 are generated from among 100 print jobs J001 to J100. The job batches JB01, JB02, and JB03 each register an identifier (CP01, CP02, CP03) of corresponding continuous paper CP and print jobs (J001 to J020, J021 to J050, J051 to J100) assigned to the continuous paper CP.

The print job management device 30 transmits the generated job batches JB to the print controller 20 of the printer 10 (see FIG. 1). The printer 10 does printing in accordance with the print jobs registered in each job batch JB.

Figure 5:
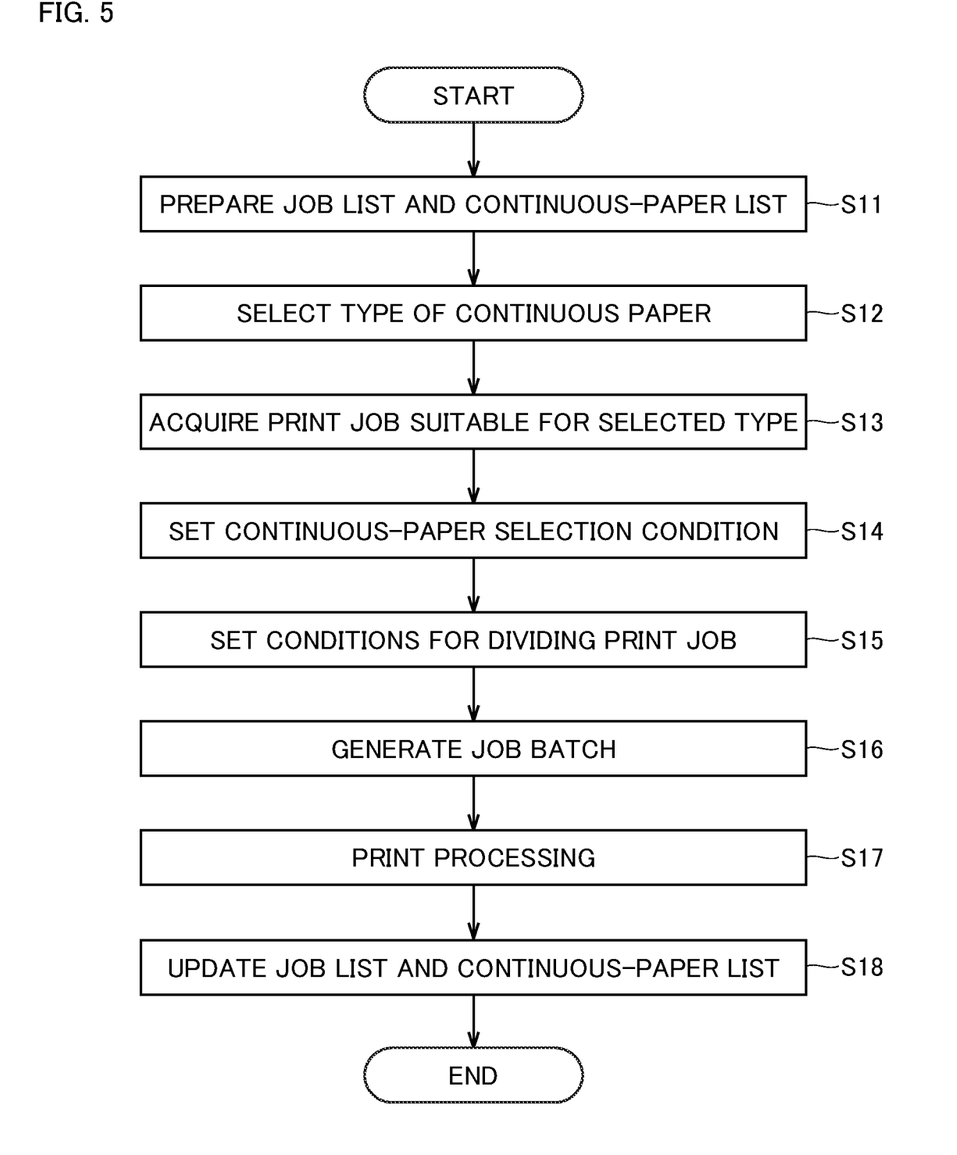
FIG. 5 is a flowchart of processing to be executed by the printing system.

FIG. 5 is a flowchart of processing performed by the printing system 1. Steps S11 to S16 and step S18 illustrated in FIG. 5 are processing performed by the print job management device 30. Step S17 illustrated in FIG. 5 is processing performed by the printer 10.

First, the print job management device 30 prepares the job list L1 and the continuous paper list L2 (step S11). The job list L1 and the continuous paper list L2 are stored in the job list storage 321 and the continuous-paper list storage 323, respectively.

When the job list L1 and the continuous paper list L2 have been prepared, a user selects the type of continuous paper CP to be used for printing (step S12). This selection of the type is made via the input part 33.

The job batch generator 315 acquires, from the job list L1, print jobs associated with paper information that matches the type selected in step S12 (step S13). A group of print jobs acquired in step S13 is referred to as a "target print job group."

When the acquisition of print jobs in step S13 is completed, the user sets a continuous-paper selection condition (step S14). The continuous-paper selection condition is a rule that is applied when continuous paper CP to be used for printing is selected from among the continuous paper list L2. Conceivable examples of the continuous-paper selection condition include "Priority on Consumption" and "Priority on Efficiency."

"Priority on Consumption" refers to settings in which continuous paper CP with a smaller remaining amount is used with higher priority. For example, in the case of the continuous paper list L2 illustrated in FIG. 4, continuous paper CP01 with a smallest remaining amount is used with high priority. In the case where the use of only the continuous paper CP01 is not enough, continuous paper CP02, continuous paper CP03, and continuous paper CP04 are used in the order specified. In the case where "Priority on Consumption" is set, a stock of a plurality of rolls of continuous paper CP can be used without waste because continuous paper CP with a smaller remaining amount is selected with higher priority.

"Priority on Efficiency" refers to settings in which the number of rolls of continuous paper CP to be used for printing is minimized as small as possible. In the case where "Priority on Efficiency" is set, the number of exchanges of continuous paper CP necessary for printing of the target print job group can be minimized as small as possible. This improves the efficiency of printing. Note that, in the case of "Priority on Efficiency" as well, continuous paper CP with a remaining amount that is as small as possible is selected with higher priority. This allows efficient consumption of a stock of continuous paper CP.

When the continuous-paper selection condition has been set, the user sets a condition for dividing a print job (step S15). The condition for dividing a print job is a rule that is applied when the target print job group is divided into a plurality of groups. Specifically, conceivable examples of the condition of division include "Undividable," "Dividable/Order Unchanged," and "Dividable/No Particular Order.".

"Undividable" refers to settings in which the division of the target print job group is not allowed. For example, in the case where all print jobs in the target print job group need to be printed on one continuous paper CP, the condition of division is set to "Undividable." In the case of "Undividable," a job batch JB is generated that assigns all print jobs in the target print job group to one roll of continuous paper CP.

"Dividable/Order Unchanged" refers to settings in which, when the target print job group is divided into a plurality of groups, the order defined in the job list L1 is kept unchanged. For example, in the case where the job list L1 registers print jobs in the order intended by the user, a change in the order of printing may require additional operations such as interchanging or sorting to be performed on resultant printed matter. In such a case, if the condition of division is set to "Order Unchanged," the order of printing is kept unchanged and the occurrence of operations such as sorting or interchanging is reduced.

"Dividable/No Particular Order" refers to settings in which, when the target print job group is divided into a plurality of groups, the order defined in the job list L1 is not maintained. In the case where there is no need to maintain the order defined in the job list L1, the condition of division is set to "No particular Order."

When the continuous-paper selection condition has been set in step S14 and the condition of division has been set in step S15, the job batch generator 315 generates the job batch JB (step S16). The job batch generator 315 generates the job batches JB in accordance with the job attribute information registered in the job list L1, the continuous-paper attribute information registered in the continuous paper list L2, the continuous-paper selection condition, and the condition of division.

In the case of generating the job batch JB, the job batch generator 315 first selects one roll of continuous paper CP. The selection of the continuous paper CP is made in accordance with the continuous-paper selection condition set in step S14 ("Priority on Consumption" or "Priority on Efficiency"). Then, the job batch generator 315 assigns one or more print jobs extracted from the target print job group to the selected continuous paper CP.

Undividable Case

In the case where the condition of division is "Undividable," all print jobs in the target print job group need to be printed by one operation. Thus, the job batch generator 315 selects continuous paper CP that has a length capable of printing the target print job group by one operation, i.e., a length greater than a total print length of the target print job group. Then, the job batch generator 315 generates one job batch JB that registers the selected continuous paper CP and the target print job group. Note that in the case where the continuous paper list L2 does not contain any continuous paper CP that can be used for printing of all the print jobs by one operation, the job batch generator 315 may display an error that indicates the above unprintable condition on the display 34.

Dividable Case

In the case where the condition of division is either "Dividable/Order Unchanged" or "Dividable/No Particular Order," the job batch generator 315 selects one roll of continuous paper CP in accordance with the continuous-paper selection condition and extracts one or more print jobs that are printable on the selected continuous paper CP from the target print job group. At this time, in the case where the condition of division is "Dividable/Order Unchanged," the job batch generator 315 extracts print jobs in sequence in the order defined in the job list L1. On the other hand, in the case where the condition of division is "Dividable/No Particular Order," the job batch generator 315 extracts print jobs in no particular order from the job list L1. The job batch generator 315 extracts one or more print jobs such that a total sum of the print lengths of the extracted print jobs does not exceed the remaining amount of the selected continuous paper CP. Then, the job batch generator 315 generates the job batch JB that registers the selected continuous paper CP and the extracted print jobs in a pair.

Next, the details of step S16 (processing for generating a job batch) illustrated in FIG. 5 will be described with reference to both the case where the continuous-paper selection condition is "Priority on Consumption" and the case where the continuous-paper selection condition is "Priority on Efficiency."

Figure 6:
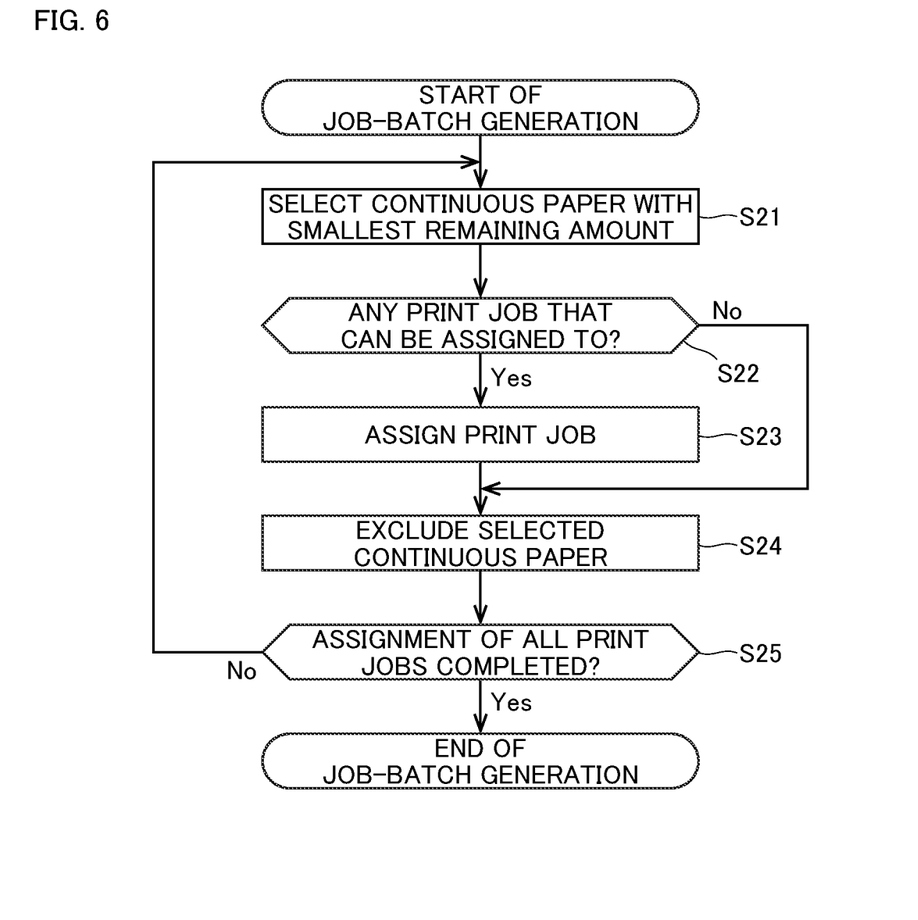
FIG. 6 is a flowchart of operations performed by a job batch generator when a continuous-paper selection condition is "Priority on Consumption."

FIG. 6 is a flowchart of the operations of the job batch generator 315 when the continuous-paper selection condition is "Priority on Consumption." When the continuous-paper selection condition is "Priority on Consumption," the job batch generator 315 first selects a roll of continuous paper CP with a smallest remaining amount from among one or more rolls of continuous paper CP that are the continuous paper CP registered in the continuous paper list L2 and that match the paper type selected in step S12 (step S21). Then, the job batch generator 315 determines whether the target print job group includes any print job that can be assigned to the continuous paper CP selected in step S21 (step S22). At this time, the job batch generator 315 determines the presence or absence of the print job that can be assigned to, in accordance with the remaining amount of the continuous paper CP selected in step S21, the print lengths of unregistered print jobs, and the condition of division.

When it is determined in step S22 that the target print job group includes a print job that can be assigned to (Yes), the job batch generator 315 assigns one or more print jobs to the continuous paper CP selected in step S21 (selected continuous paper CP) (step S23). That is, the job batch generator 315 generates the job batch JB that registers the selected continuous paper CP and one or more print jobs.

When the condition of division is "Order Unchanged," in step S22, a print job with the lowest job ID in the job list L1 is extracted from among unregistered print jobs in the target print job group that are not registered in the job batch JP. Then, whether the extracted print job is printable on the selected continuous paper CP is determined. If it is determined that the extracted print job is printable, in step S23, print jobs are extracted in sequence in the order of the job ID in the job list L1 within a range that a sum of the print lengths does not exceed the remaining amount of the selected continuous paper CP.

When the condition of division is "No Particular Order," it is determined in step S22 whether there is any print job that is printable on the selected continuous paper CP. If it is determined that there is a printable print job, in step S23, print jobs are extracted in no particular order from among a group of unregistered print jobs within a range that a sum of the print lengths does not exceed the remaining amount of the selected continuous paper CP. In the case of "No Particular Order," a plurality of print jobs are assigned to the selected continuous paper CP, irrespective of the order of the job ID in the job list L1. Thus, in the case of "No Particular Order," the remaining amount of the continuous paper CP can be consumed efficiently.

When step S23 is completed or when it is determined in step S22 that the assignment is not possible, the job batch generator 315 performs processing for excluding the selected continuous paper CP from the candidates for selection (step S24). Step S24 may, for example, be processing for setting a flag to the selected continuous paper CP in the continuous paper list L2. The execution of step S24 avoids the possibility that the same continuous paper CP is selected again to generate the job batch JB.

After step S24, the job batch generator 315 determines whether all print jobs included in the target print job group have been registered in the job batch JB (step S25). If it is determined in step S25 that the target print job group still includes an unregistered print job (No), the job batch generator 315 again performs the processing in step S21 onward. On the other hand, if it is determined in step S25 that all print jobs included in the target print job group have been registered in the job batch JB (Yes), the job batch generator 315 ends the processing for generating the job batch JB.

Figure 7:
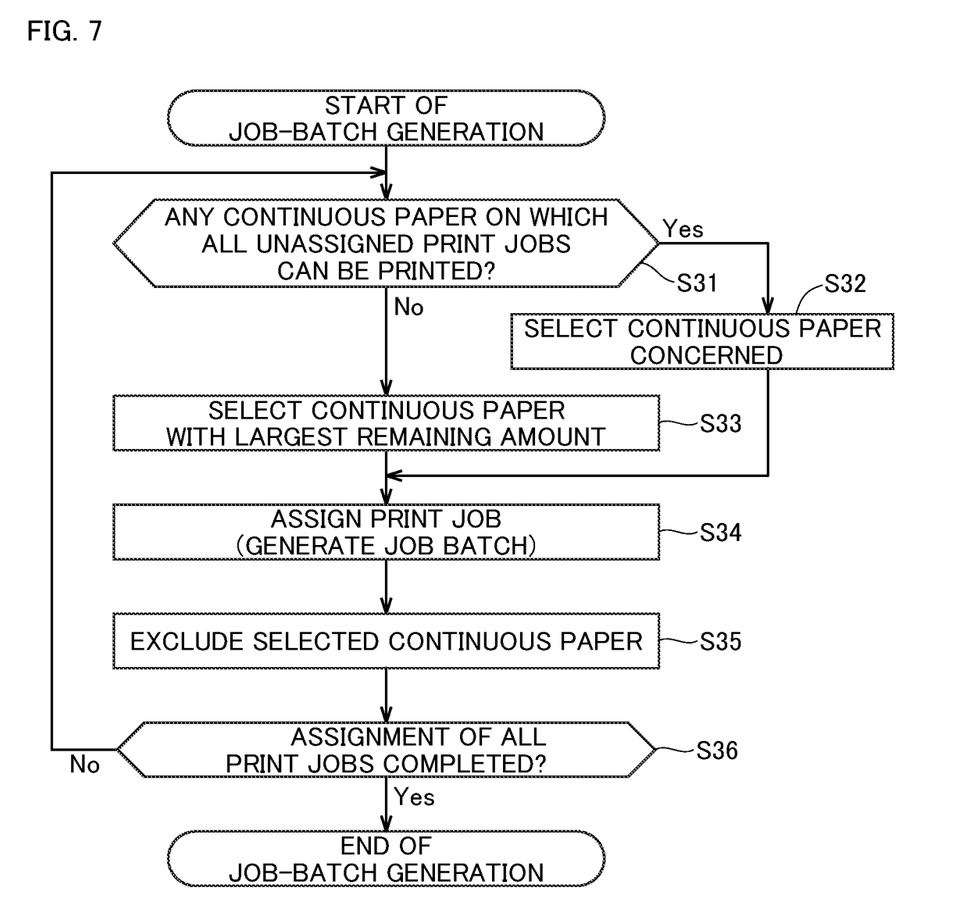
FIG. 7 is a flowchart of operations performed by the job batch generator when the continuous-paper selection condition is "Priority on Efficiency."

FIG. 7 is a flowchart of the operations of the job batch generator 315 when the continuous-paper selection condition is "Priority on Efficiency." When the continuous-paper selection condition is "Priority on Efficiency," the job batch generator 315 first determines whether any continuous paper CP on which all unregistered print jobs are printable is included in one or more rolls of continuous paper CP that are the continuous paper CP registered in the continuous paper list L2 and that matches the paper type selected in step S12 (step S31). If it is determined in step S31 that there is such printable continuous paper CP, the job batch generator 315 selects this continuous paper CP (step S32). If it is determined in step S31 that there is no such printable continuous paper CP, the job batch generator 315 selects continuous paper CP with a largest remaining amount (step S33).

When the continuous paper CP has been selected in step S32 or S33, the job batch generator 315 generates the job batch JB that assigns print jobs to the continuous paper CP concerned (selected continuous paper CP) (step S34). Specifically, the job batch generator 315 extracts a print job that has not been registered in the job batch JB from the target print job group in accordance with the condition of division and within a range that a sum of the print lengths does not exceed the remaining amount of the selected continuous paper CP. This extraction of the print job is conducted in the same manner as in step S23. Then, the job batch generator 315 generates the job batch JB that registers the selected continuous paper CP and the extracted print job.

When step S34 is completed, the job batch generator 315 performs processing for excluding the selected continuous paper CP from the candidates for selection in step S32 or step S33 in the continuous paper list L2 (step S35). Step S35 may, for example, be processing for setting a flag to the selected continuous paper CP in the continuous paper list L2. The execution of step S35 avoids the possibility that the same continuous paper CP is selected again to generate the job batch JB.

After step S35, the job batch generator 315 determines whether all print jobs included in the target print job group have been registered in the job batch JB (step S36). If it is determined in step S36 that the target print job group includes any unregistered print job, the job batch generator 315 returns again to step S31 and performs the processing in step S31 onward. On the other hand, if it is determined in step S36 that all print jobs included in the target print job group have been registered in the job batch JB, the job batch generator 315 ends the processing for generating the job batch JB.

Referring back to FIG. 5, when the job batch JB has been generated, the print job management device 30 transmits the generated job batch JB to the print controller 20 of the printer 10. The printer 10 does printing in accordance with the received job batch JB (step S17). At this time, the continuous paper CP registered in the job batch JB is placed on the feed roller 11 and the take-up roller 13, and printing is done in accordance with the print jobs registered in the job batch JB.

In step S17, information on the continuous paper CP that is to be placed in the printer 10 may be displayed on the display 34 of the print job management device 30 or on a display (not shown) of the printer 10. Then, the user may place the displayed continuous paper CP on the printer 10. As another alternative, in the case where the printer 10 includes a device that takes specific continuous paper CP out of the continuous-paper stocker 22, this device may be used to take the target continuous paper CP out of the continuous-space stocker 22 in accordance with the job batch JB.

After step S17, the job list management part 311 and the continuous-paper list management part 313 update the job list L1 and the continuous paper list L2, respectively (step S18). For example, the job list management part 311 may delete print jobs whose printing has been completed, from the job list L in step S18. Note that, instead of deleting print jobs, the job list management part 311 may perform processing (e.g., flag processing) for recording, on the job list L1, information that indicates the completion of printing of the print jobs concerned. Moreover, the continuous-paper list management part 313 updates the remaining amount of the continuous paper CP used for printing, which is registered in the continuous paper list L2, in accordance with the amount of usage. Specifically, the continuous-paper list management part 313 sets the remaining amount registered in the continuous paper list L2 to a value obtained by subtracting the amount of usage from the above remaining amount. In this way, since the remaining amount of the continuous paper CP registered in the continuous paper list L2 is updated, it is possible to select appropriate continuous paper CP when the next print job is printed. In the case where the continuous paper CP used for printing becomes unusable (the remaining amount becomes zero or less than a predetermined threshold value), the continuous-paper list management part 313 may perform processing for deleting this continuous paper CP from the continuous paper list L2 or processing for recording information indicating that the continuous paper has become unable to be used.

Note that step S18 (processing for updating the lists) does not necessarily have to be performed after step S17 (print processing). Step S18 may be performed with arbitrary timing after step S16 (processing for generating the job batch JB).

Figure 8:
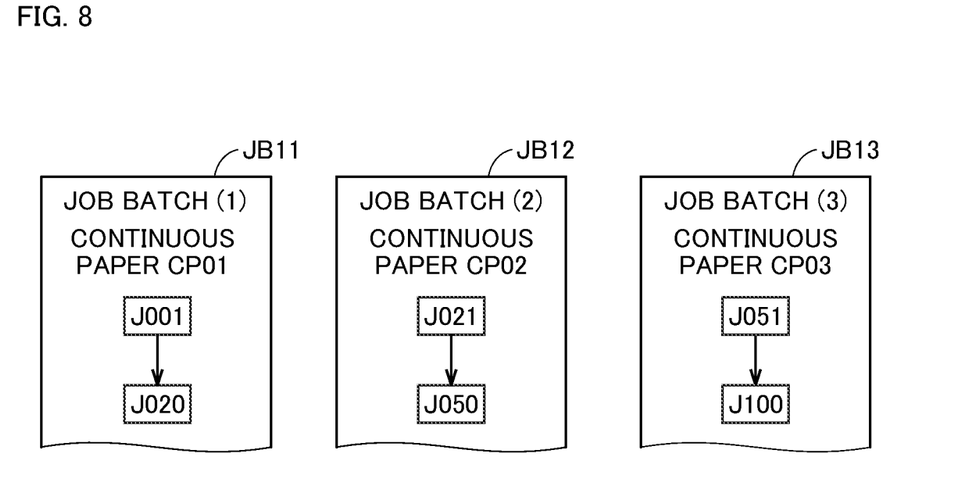
FIG. 8 is an illustration of three job batches generated in the case of "Priority on Consumption."
Figure 9:
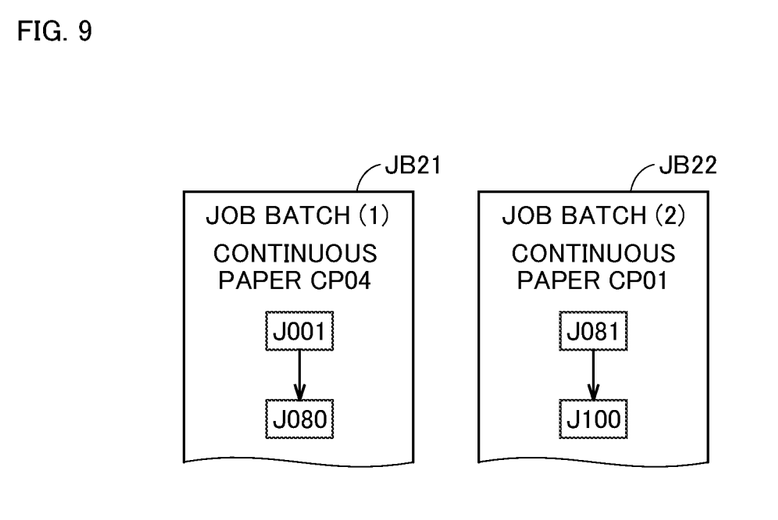
FIG. 9 is an illustration of two job batches generated in the case of "Priority on Efficiency."

FIG. 8 is an illustration of three job batches JB11, JB12, and JB13 generated in the case of "Priority on Consumption". FIG. 9 is an illustration of two job batches JB21 and JB22 generated in the case of "Priority on Efficiency."

FIGS. 8 and 9 illustrate job batches that are generated when the 100 print jobs J001 to J100 registered in the job list L1 illustrated in FIG. 3 are executed using the four rolls of continuous paper CP01 to CP04 registered in the continuous paper list L2 illustrated in FIG. 4. The print lengths of the print jobs J001 to J100 are all set to 100 m. The remaining amounts of the rolls of continuous paper CP01 to CP04 are set to 2000 m, 3000 m, 5000 m, and 8000 m, respectively. Moreover, "Dividable/Order Unchanged" is applied as the condition of division in the case of generating the job batches JB.

As described above, in the case of "Priority on Consumption," continuous paper CP with a smaller remaining amount is selected with higher priority. Thus, as illustrated in FIG. 8, the job batches JB11 to JB13 are generated in correspondence with the rolls of continuous paper CP01 (2000 m), CP02 (3000 m), and CP03 (5000 m) that have smaller remaining amounts in the continuous paper list L2. Then, the job batches JB11 to JB13 respectively register print jobs J001 to J020 (with a total print length of 2000 m), print jobs J021 to J050 (with a total print length of 3000 m), and print jobs J051 to J100 (with a total print length of 5000 m), all of the print jobs being printable in amount on the corresponding rolls of continuous paper CP. Then, printing is done in accordance with the job batches JB11 to JB13. Accordingly, it is possible to sequentially consume the three rolls of continuous paper CP01 to CP03 with smaller remaining amounts selected from among the four rolls of continuous paper CP01 to 04 registered in the continuous paper list L2.

On the other hand, in the case of "Priority on Efficiency," the continuous paper CP is selected so as to minimize the number of rolls of continuous paper CP to be used for printing. Thus, as illustrated in FIG. 9, a job batch JB21 is generated that corresponds to the continuous paper CP04 (8000 m) with a largest remaining amount in the continuous paper list L2. Then, the job batch JB21 registers print jobs J001 to J080 (with a total print length of 8000 m) that are printable on the continuous paper CP04. Then, for the remaining print jobs J081 to J100, the second job batch JB22 is generated that registers the continuous paper CP01 (with a remaining amount of 2000 m) that covers the print lengths of the above print jobs. Since the two rolls of continuous paper CP are used for printing in accordance with the job batches JB21 and JB22, the continuous paper CP needs to be exchanged only once. On the other hand, since the three rolls of continuous paper CP are used in the case of "Priority on Consumption," the continuous paper CP needs to be exchanged twice. In this way, in the case of "Priority on Efficiency" the number of exchanges of the continuous paper CP is reduced by reducing the number of rolls of continuous paper CP. This improves the efficiency of printing.

2. Variations

While the above has been a description of the embodiment, the present invention is not intended to be limited to the example described above, and may be modified in various ways.

For example, in the above-described embodiment, when a plurality of print jobs are divided into a plurality of job batches JB, the division is made on a print job basis. Alternatively, one print job may be divided into a plurality of job batches JB. For example, in the case where the content of a print job is printing 100 copies of the same printed matter, this print job may be divided into two batches, 50 copies each, on a copy basis. In this way, if the division of one print job is allowed, print jobs that are as large as possible in number can be assigned to the remaining amount of the continuous paper CP. This improves the efficiency of consumption of the continuous paper CP.

Although the condition of division may be evenly applied to all print jobs, the condition of division to be applied to may be set on a print job basis. As another alternative, the condition of division may be registered in advance in the job attribute information for each print job. For example, "Order Unchanged" may be set in advance for the print jobs J001 to J0050, and "No Particular Order" may be set in advance for the print jobs J051 to J100. In this case, in the case of generating the job batches JB, the job batch generator 315 may apply "Order Unchanged" to the print jobs J001 to J050 and "No Particular Order" to the print jobs J051 to J100 in accordance with the job attribute information.

The printer 10 may further include a mechanism for, after completion of printing, adding a label (e.g., labeled tape) to the continuous paper CP used for printing, the label recording information such as the identifier of the continuous paper CP and the remaining amount of the continuous paper CP. In this case, it is possible to manage a plurality of rolls of continuous paper CP and their remaining amounts in accordance with the added labels.

In the above-described embodiment, a roll of continuous paper CP is described as the continuous base material by way of example. However, the continuous base material does not necessarily have to be a roll of material. For example, the continuous base material may be folded, like a continuous book. Moreover, the continuous base material is not limited to paper. The continuous base material may be formed of a material other than paper, such as a resin film.

While the invention has been shown and described in detail, the foregoing description is in all aspects illustrative and not restrictive. It is therefore understood that numerous modifications and variations that are not described above can be devised without departing from the scope of the invention. The configurations in the embodiment and variations described above may be appropriately combined or omitted as long as there are no mutual inconsistencies.

What is claimed is:

1. A print job management method for managing a print job that defines print content to be printed on a long band-like continuous base material by a printer, the print job management method comprising:
   a) preparing a continuous-base-material list that is a list of a plurality of continuous base materials and that registers continuous-base-material attribute information that includes paper remaining information that indicates a remaining length of each of the plurality of continuous base materials;
   b) preparing a job list that is a list of a plurality of print jobs, each being the print job, and that registers job attribute information that includes print length information that indicates a length of a continuous base material necessary for printing of each of the plurality of print jobs; and
   c) generating a job batch that defines a continuous base material and a target print job in accordance with the continuous-base-material attribute information and the job attribute information, the continuous base material being from among the continuous-base-material list, the target print job being extracted from among the job list and printable on the continuous base material selected,
   wherein the operation c) includes dividing a dividable print job that is printable separately on different continuous base materials in the job list into multiple job batches, each of which is the print job.

2. The print job management method according to claim 1, wherein
   the operation c) includes selecting a continuous base material with a smaller remaining amount with higher priority from among the continuous-base-material list.

3. The print job management method according to claim 1, wherein
   the operation c) includes selecting a continuous base material from among the continuous-base-material list to minimize a total number of continuous base materials to be used for printing of the plurality of print jobs in the job list.

4. The print job management method according to claim 1, wherein
   the operation c) includes dividing the plurality of print jobs in the job list into a plurality of job batches, each being the job batch, while keeping an order defined in the job list unchanged.

5. The print job management method according to claim 1, wherein
   the operation c) includes dividing the plurality of print jobs in the job list into a plurality of job batches, each being the job batch, in no particular order.

6. The print job management method according to claim 1, wherein
   the continuous-base-material attribute information further includes type information that indicates a type of each of the plurality of continuous base materials, and
   the job attribute information includes base material information that indicates a type of a continuous base material to be used for printing.

7. A printing method comprising:
   performing the print job management method according to claim 1; and doing printing on the continuous base material defined in the job batch in accordance with the print job defined in the job batch.

8. A recording medium recording a program that is executable by a computer,
the program causing the computer to execute the print job management method according to claim 1.

9. A print job management device for managing a print job that defines print content to be printed on a long band-like continuous base material by a printer,
the print job management device comprising:
a processor; and
a memory electrically connected to the processor and storing a program, wherein:
the program, when executed by the processor, causes the processor to perform:
   a continuous-base-material list management process to manage a continuous-base-material list that is a list of a plurality of continuous base materials, each being the continuous base material, and that registers continuous-base-material attribute information that includes paper remaining information that indicates a remaining length of each of the plurality of continuous base materials;
   a job list management process to manage a job list that is a list of a plurality of print jobs, each being the print job, and that registers job attribute information that includes print length information that indicates a length of a continuous base material necessary for printing of each of the plurality of print jobs; and
   a job batch generation process to generate a job batch that defines a continuous base material and a target print job in accordance with the continuous-base-material attribute information and the job attribute information, the continuous base material being selected from among the continuous-base-material list, the target print job being extracted from among the job list and printable on the continuous base material selected, and
   the job batch generation process includes dividing a dividable print job that is printable separately on different continuous base materials in the job list job into multiple job batches, each of which is the print job.

10. A printing apparatus comprising:
the print job management device according to claim 9; and
a printer that does printing of the print job on the continuous base material, the print job and the continuous material being defined by the job batch, the job batch being generated by the print job management device.

11. A print job management method for managing a print job that defines print content to be printed on a long band-like continuous base material by a printer, the print job management method comprising:
a) preparing a continuous-base-material list that is a list of a plurality of continuous base materials and that registers continuous-base-material attribute information that includes paper remaining information that indicates a remaining length of each of the plurality of continuous base materials;
b) preparing a job list that is a list of a plurality of print jobs, each being the print job, and that registers job attribute information that includes print length information that indicates a length of a continuous base material necessary for printing of each of the plurality of print jobs; and
c) generating a job batch that defines a continuous base material and a print job in accordance with the continuous-base-material attribute information and the job attribute information, the continuous base material being from among the continuous-base-material list, the print job being extracted from among the job list and printable on the continuous base material selected, wherein:
the job attribute information includes dividing condition information set for each print job, and
the dividing condition information includes information indicating whether the print job can be divided from another print job, or whether the print job can be changed in printing order with another print job.

12. A print job management device for managing a print job that defines print content to be printed on a long band-like continuous base material by a printer, the print job management device comprising:
a processor; and
a memory electrically connected to the processor and storing a program, wherein:
the program, when executed by the processor, causes the processor to perform:
   a continuous-base-material list management process to manage a continuous-base material list that is a list of a plurality of continuous base materials, each being the continuous base material, and that registers continuous-base-material attribute information that includes paper remaining information that indicates a remaining length of each of the plurality of continuous base materials;
   a job list management process to manage a job list that is a list of a plurality of print jobs, each being the print job, and that registers job attribute information that includes print length information that indicates a length of a continuous base material necessary for printing of each of the plurality of print jobs; and
   a job batch generator process to generate a job batch that defines a continuous base material and a print job in accordance with the continuous-base-material attribute information and the job attribute information, the continuous base material being selected from among the continuous-base-material list, the print job being extracted from among the job list and printable on the continuous base material selected, wherein:
the job attribute information includes dividing condition information set for each print job, and
the dividing condition information includes information indicating whether the print job can be divided from another print job, or whether the print job can be changed in printing order with another print job.

* * * * *